April 30, 1957 — L. GELFAND — 2,790,887
DOMESTIC APPLIANCE
Filed Feb. 24, 1955 — 5 Sheets-Sheet 1

INVENTOR.
Louis Gelfand
BY R R Candor
HIS ATTORNEY

April 30, 1957　　　L. GELFAND　　　2,790,887
DOMESTIC APPLIANCE
Filed Feb. 24, 1955　　　5 Sheets-Sheet 3

INVENTOR.
Louis Gelfand
BY R R Candor
HIS ATTORNEY

INVENTOR.
Louis Gelfand
BY R R Candor
HIS ATTORNEY

United States Patent Office 2,790,887
Patented Apr. 30, 1957

2,790,887

DOMESTIC APPLIANCE

Louis Gelfand, Detroit, Mich., assignor to General Motors Corporation, Detroit, Mich., a corporation of Delaware Application February 24, 1955, Serial No. 490,387

4 Claims. (Cl. 219—37)

This invention relates to a domestic appliance and more particularly to domestic electric kitchen appliances such as griddles, grills and waffle irons.

Many kitchen appliances are used only occasionally after which they are stored away. Every time they are to be used they must be brought out again. This discourages more frequent use and lessens the value of the appliance to the owner. Ordinarily, all the working space provided in the kitchen is needed at one time or another in food preparation. Therefore, storage of such appliances in the working space is objectionable.

It is an object of my invention to provide an arrangement for domestic electric appliances by which the appliance quickly and easily disappears from the working space when not in use and yet quickly and easily reappears onto the working space for immediate use.

It is another object of my invention to provide an arrangement by which a combination griddle, grill and waffle iron may be kept in a receptacle or well when not in use and which rises out of the receptacle or well and folds open in one continuous movement for use as a griddle and which folds closed after loading and disappears when used as a grill or waffle iron.

These and other objects are obtained in the form shown in the drawings in which the combined griddle, grill and waffle iron is mounted for vertical movement within a well or receptacle. The lifting of the handle of the upper element opens the griddle and at the same time operates a counterbalance leverage element by which both elements are guided up and out of the well as the opening movement proceeds. For use as a griddle, the upper element may be folded over the lower element through an angle of 180° to provide two heated smooth surfaces for grilling sandwiches or the like with the plane surfaces located in spaced relationship. As the top element is folded over, the lower element disappears and finally the upper element also disappears in the well. The use as a waffle iron is similar to grilling sandwiches and the like, with the exception that the surface elements are turned over to present the irregular waffle surface.

Further objects and advantages of the present invention will be apparent from the following description, reference being had to the accompanying drawings wherein a preferred embodiment of the present invention is clearly shown.

Figure 1:
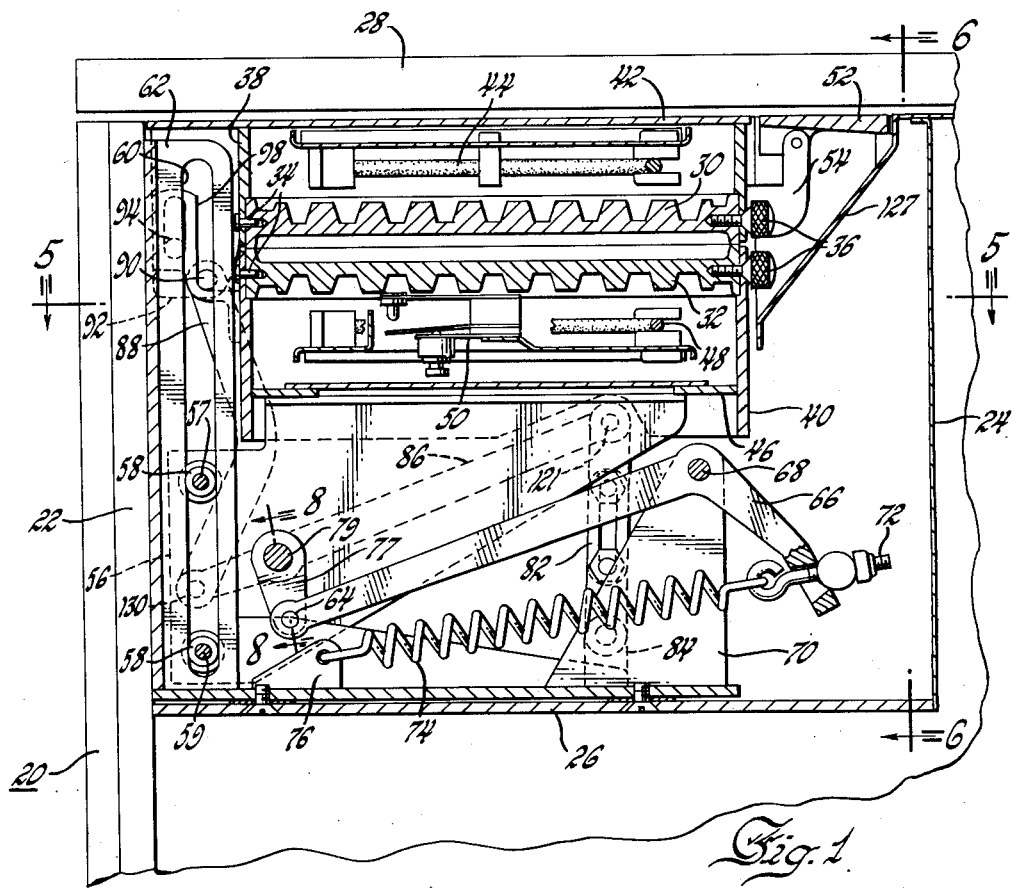
Figure 1 is a vertical sectional view through the combination griddle, grill and waffle iron within a well or receptacle in an appliance cart or working surface taken along the line 1—1 of Figure 6.

Referring now to the drawings, there is shown a portion of an appliance cart 20 which may be mounted upon the rubber tired wheels with two of the wheels being swivel wheels. The cart includes a well or receptacle formed of the side walls 22 and 24 and a bottom wall 26. The cart 20 is also provided with a lid 28 which closes the well or receptacle when the cart is not in use. Instead of being a part of a cart, this structure may be a part of the customary working surface in a kitchen. For the purpose of illustrating my invention, I have shown a combined griddle, grill and waffle iron which includes an upper cooking element 30 and a lower cooking element 32. These elements are firmly held in place by the pins 34 at one end and by the thumb screws 36 at the opposite ends. A wide frame 38 extends around the upper element and a similar frame 40 extends around the lower element. The frames have shoulders against which the elements 30 and 32 are firmly held in place by the pins 34 and the screws 36. The frame 38 is provided with a top member 42 which supports a coiled electric heating element 44. The frame 40 is provided with a bottom wall 46 which supports a coiled electric heating element 48 as well as a suitable control means 50 for controlling the electric heaters. The frame 38 is provided with a pivoted flat handle 52 pivoted to the projecting bracket 54. The handle 52 lies flat beneath the lid 28 as shown in Figure 1.

The bottom 46 is supported by two angle brackets 56 each of which is provided with upper and lower rods 57 and 59 having on their ends the rollers 58 which operate within a long vertical slot 60 in the vertical flanges of the vertical plate guide member 62. On opposite sides of the brackets 56 in front of the flanges of the guide member 62 are the pins 64 at the long ends of the bell crank arms 66 which are pivoted upon the rod 68. This rod 68 is rotatably mounted in the supporting brackets 70 which are fastened to the base 26. Connected to the end portion of the short arm of the bell crank lever 56 by a ball and socket connection are the eye screws 72 which hold one end of the tension coil spring 74. The opposite ends of the spring 74 are connected to a shorter bracket 76 fastened to the base 26. The pins 64 are connected by the links 77 to the rod 79 extending through and connected to the brackets 56. The springs 74 exert sufficient pull on the bell crank lever 66 to substantially counterbalance the weight of all of the parts supported by the brackets 56.

There is also a second linkage arrangement which includes the adjustable links 82 which are pivoted at their ends to the brackets 84 mounted upon the base 26. These links 82 are formed of two members each having a pivotal connection at their remote ends and having overlapping slots or holes at their adjacent ends each clamped together with bolts. The upper ends of the links 82 are pivotally connected to the long end of the levers 86 which are also pivoted on the rod 79. The short ends of the levers 86 are pivotally connected by a pin 130 to a bent connecting rod 88. The upper end of the connecting rods 88 are each provided with a pin 90 which is pivotally connected to the bottom portion of a bracket 92 connected to upper frame 38 and the top 42. The bracket 92 is provided with a pin 94 which rides within a slot 96 provided in a bracket 98 connected to the adjacent portion of the lower frame 40.

Figure 2:
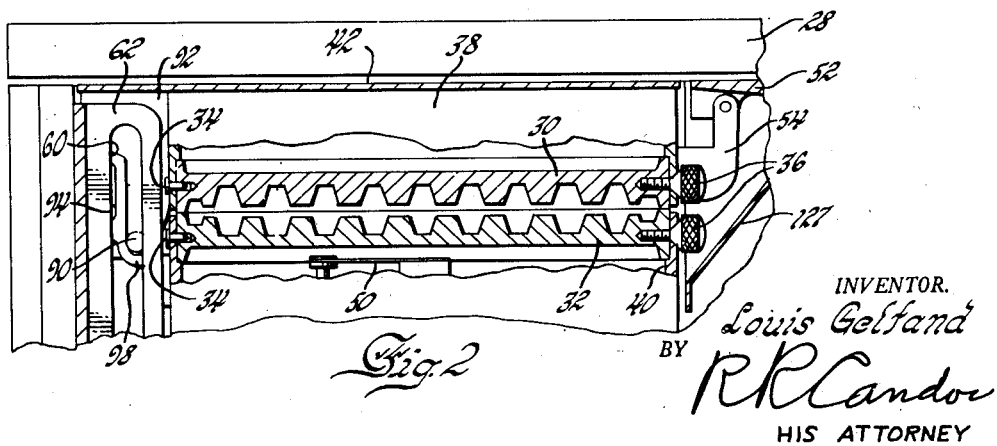
Figure 2 is a fragmentary vertical sectional view similar to Figure 1 but showing the cooking surfaces now turned to present the irregular waffle surfaces facing each other.
Figure 3:
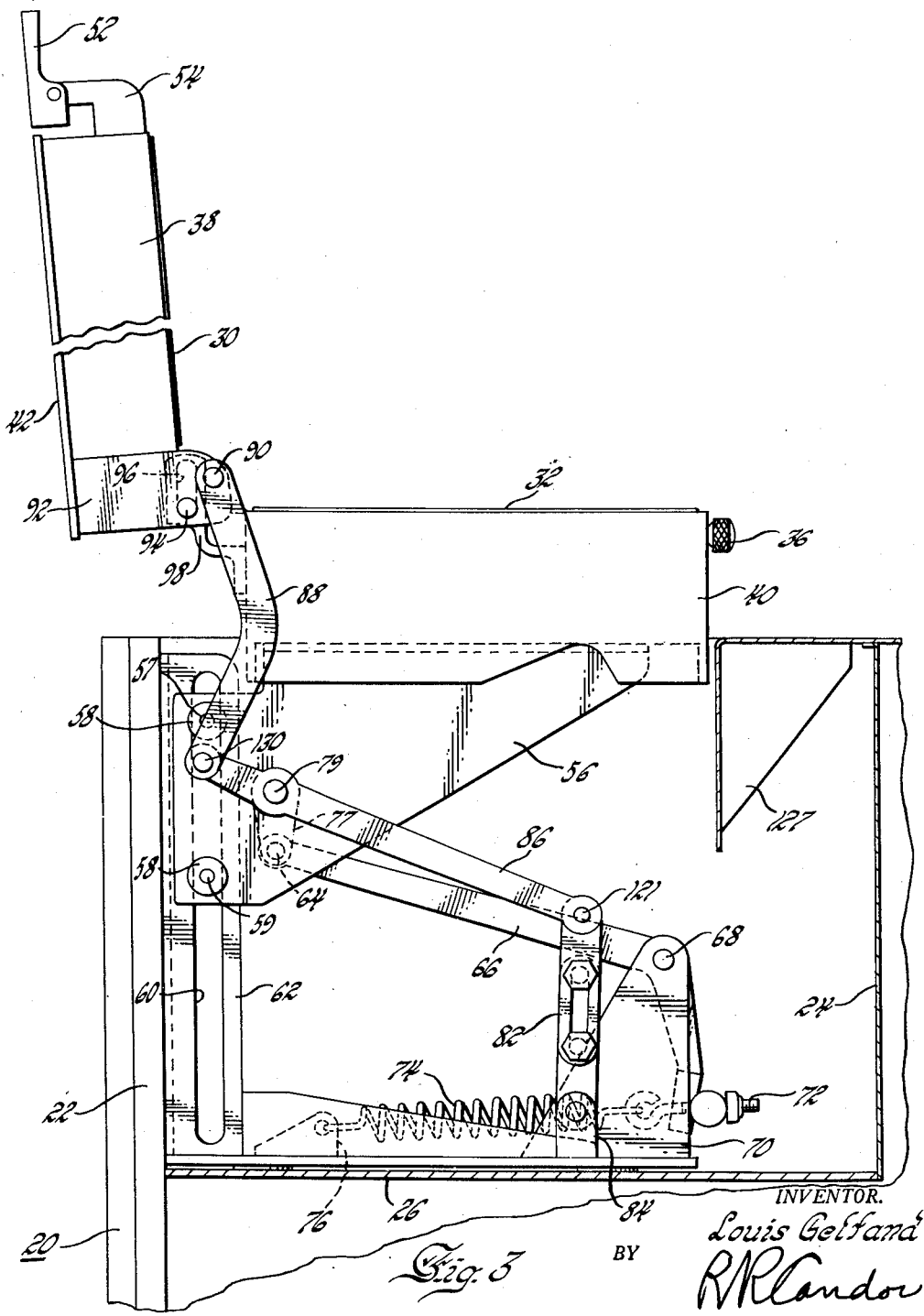
Figure 3 is a view in elevation showing the upper element opened through an angle of about 100°.

By virtue of the two linkage systems, when the lid 28 is removed and the handle 52 is lifted, the connecting rod 88 is pulled upwardly by the pivoting of the frame 38. This causes the lever 86 to be pivoted upwardly about the pivot pins 121 at the upper ends of the levers 82 to simultaneously raise the brackets 56 and the entire lower unit within the frame 40 to the position shown in Figure 3. This upward movement is made easy by the counterbalancing pull of the spring 74 which pivots the bell crank lever 66 in a counterclockwise direction to counterbalance the pull of gravity upon the units. As shown in Fig. 3 the appliance is in the open position for loading it as a grill. Any type of food which may be cooked in a grill may be loaded in this position. If it is desired to make waffles, the thumb screws 36 are removed and the elements 30 and 32 are turned over to the position shown in Fig. 2 after which the thumb screws 36 are returned to their original position to hold the elements in place in the arrangement shown in Fig. 2. The lower plate or element 32 is then provided with sufficient waffle batter after which the handle 52 is moved back to the position shown in Fig. 1, which causes the moving of the elements 30 and 32 together to the position shown in Figs. 1 and 2, which causes the simultaneous disappearing of the entire appliance into the well or receptacle. In this position the grilling or waffle making proceeds to completion. After completion of this opeartion, the elements are again moved to the position shown in Fig. 3 by the lifting of the handle 52. The contents are removed and further operations may take place.

Figure 4:
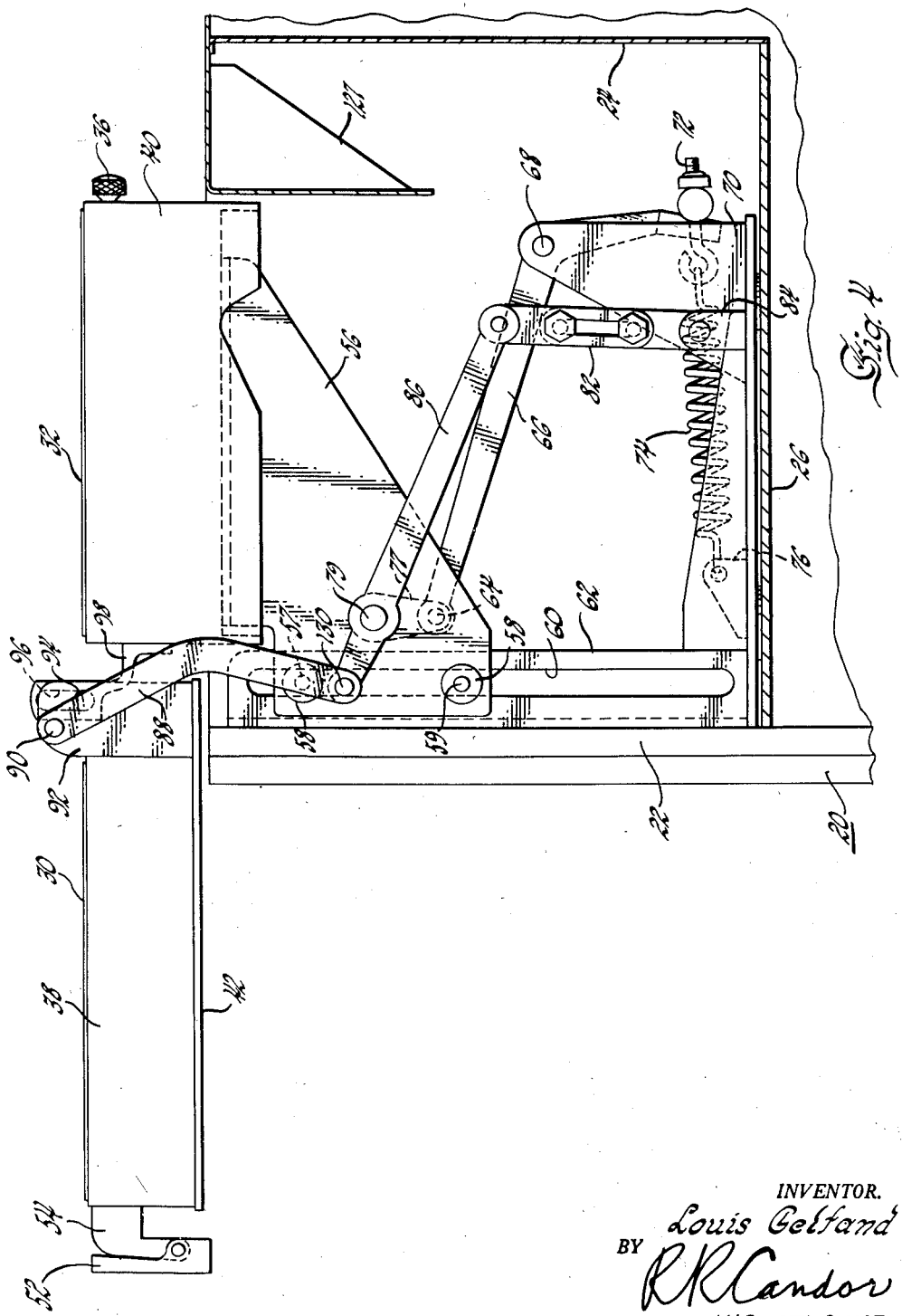
Figure 4 is a view similar to Figure 3 but showing the upper element opened by 180°.
Figure 5:
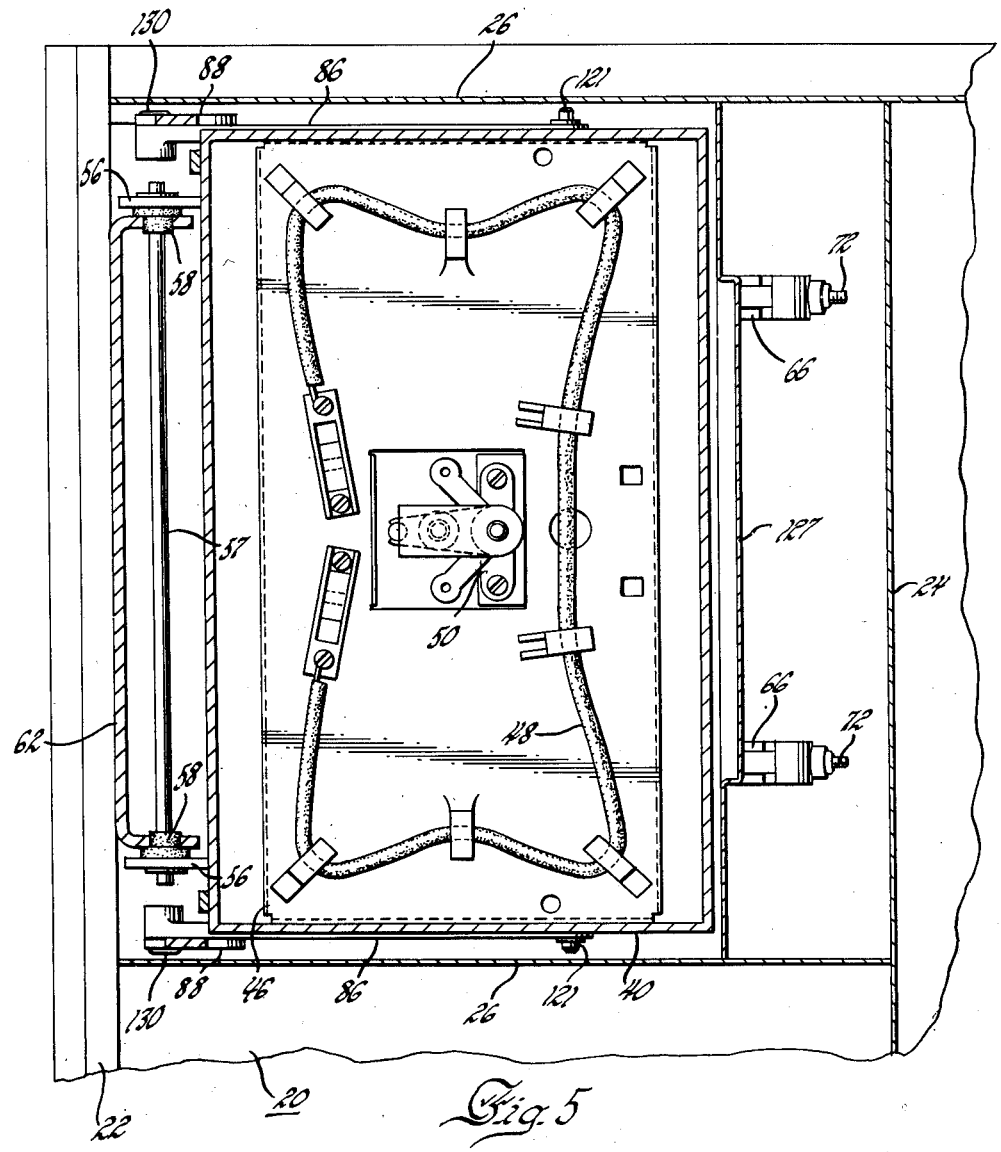
Figure 5 is a sectional view taken substantially along the line 5—5 of Figure 1.
Figure 6:
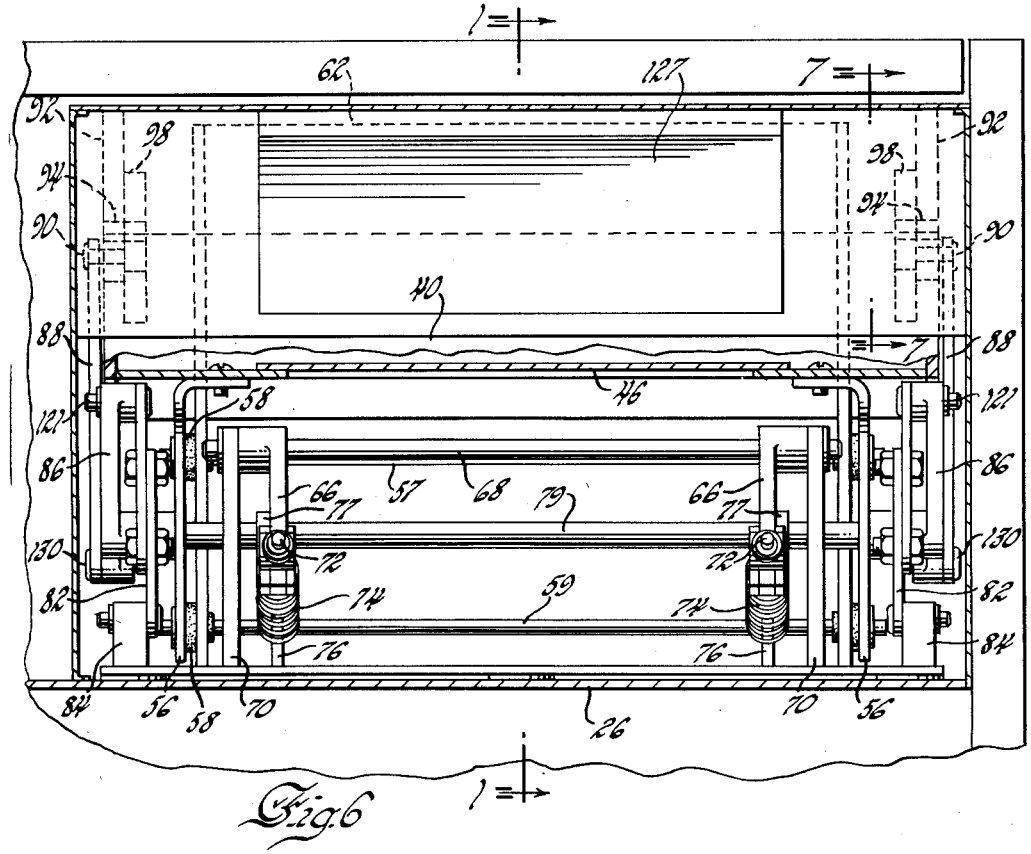
Figure 6 is a sectional view taken along the line 6—6 of Figure 1.
Figure 7:
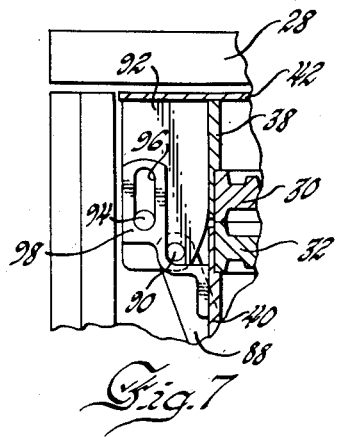
Figure 7 is a fragmentary sectional view taken along the line 7—7 of Figure 6.
Figure 8:
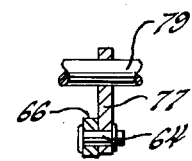
Figure 8 is a fragmentary sectional view taken along the line 8—8 of Figure 1.

When the appliance is used as a griddle, the handle 52 is moved to the position shown in Fig. 4 to place the element 30 in a horizontal position. The elevation of the element 32 is substantially unchanged. This brings both elements 30 and 32 to the same horizontal position. The elements may be used simultaneously to carry out any cooking operation normally performed on a griddle, such as frying pancakes and hamburgers. When the operation is completed, the upper element 30 is folded back upon the lower element 32 and the appliance disappears into the well and can be covered by the lid 28. The top portion of the cart 20 is provided with a recess and shield 127 for receiving the handle 52 and the bracket 54. The shield 127 prevents anyone from getting their hands down into the portion beneath the elements where the levers are located.

While the form of embodiment of the present invention as herein disclosed constitutes a preferred form, it is to be understood that other forms might be adopted.

What is claimed is as follows:

1. In combination, a support provided with a receptacle, a disappearing appliance in said receptacle, said appliance including a first element provided with a cooking surface, and a second element provided with a cooking surface, electrical heating means associated in heating relationship with said elements, a vertical guide means between said support and said second element for guiding said second element down into said receptacle and upwardly out of said receptacle, connecting means connecting said first and second elements facilitating the opening and closing of said elements, and a linkage operated by the opening movement of said first element away from said second element for moving said first and second elements upwardly out of said receptacle under the guidance of said guide means.

2. In combination, a support provided with a receptacle, a disappearing appliance in said receptacle, said appliance including a first element provided with a cooking surface, and a second element provided with a cooking surface, electrical heating means associated in heating relationship with said elements, a vertical guide means between said support and said second element for guiding said second element down into said receptacle and upwardly out of said receptacle, pivotal connecting means pivotally connecting adjacent edge portions of said elements to fold the second element upon the first element, and means operated by the pivoting of the first element away from the second element for moving said elements upwardly out of said receptacle under the guidance of said guide means.

3. In combination, a support provided with a receptacle, a disappearing appliance in said receptacle, said appliance including a first element provided with a cooking surface, and a second element provided with a cooking surface, electrical heating means associated in heating relationship with said elements, a vertical guide means between said support and said second element for guiding said second element down into said receptacle and upwardly out of said receptacle, pivotal connecting means pivotally connecting adjacent edge portions of said elements to fold the second element upon the first element, and link and lever means connected to said first element eccentrically to said pivotal connection and to said second element and said support for moving said elements upwardly out of said receptacle under the guidance of said guide means when the first element is pivoted away from the second element.

4. In combination, a support provided with a receptacle, a disappearing appliance in said receptacle, said appliance including a first element provided with a cooking surface, and a second element provided with a cooking surface, electrical heating means associated in heating relationship with said elements, a vertical guide means between said support and said second element for guiding said second element down into said receptacle and upwardly out of said receptacle, pivotal connecting means pivotally connecting adjacent edge portions of said elements to fold the second element upon the first element, a link having one portion pivotally connected to said first element eccentrically of said pivotal connection, a lever means pivotally connected to said second clement and said support, and a connection between a second portion of said link and said lever means for moving said elements upwardly out of said receptacle under the guidance of said guide means when the first element is pivoted away from the second element.

References Cited in the file of this patent
UNITED STATES PATENTS

| | | |
|---|---|---|
| 2,430,582 | Reich | Nov. 11, 1947 |
| 2,521,282 | Butler | Sept. 5, 1950 |
| 2,658,985 | Maxwell | Nov. 10, 1953 |
| 2,716,697 | Grannan | Aug. 30, 1955 |